US010093236B2

(12) United States Patent
Chien et al.

(10) Patent No.: US 10,093,236 B2
(45) Date of Patent: Oct. 9, 2018

(54) APPARATUS AND METHOD FOR SAFEGUARDING VEHICLES

(71) Applicants: Hung-Hsuan Chien, Taipei (TW); Yu-Fan Tsai, New Taipei (TW)

(72) Inventors: Hung-Hsuan Chien, Taipei (TW); Yu-Fan Tsai, New Taipei (TW)

(73) Assignee: Ible Technology Inc., Taipei (TW)

(*) Notice: Subject to any disclaimer, the term of this patent is extended or adjusted under 35 U.S.C. 154(b) by 302 days.

(21) Appl. No.: 14/547,158

(22) Filed: Nov. 19, 2014

(65) Prior Publication Data

US 2016/0137141 A1  May 19, 2016

(51) Int. Cl.
*B60R 25/10* (2013.01)
*B60R 1/12* (2006.01)
*B60R 1/04* (2006.01)

(52) U.S. Cl.
CPC ............. *B60R 1/12* (2013.01); *B60R 1/04* (2013.01); *B60R 2001/1215* (2013.01); *B60R 2001/1253* (2013.01)

(58) Field of Classification Search
CPC .......... B60R 11/00; B60R 11/04; B60R 1/12; B60R 1/04; B60R 2001/1215; B60R 2001/1253; G07C 5/0891
USPC ..... 340/426.24, 426.25; 307/10.1, 10.2, 326, 307/132 EA; 348/148, 149, 152, 153, 348/154, 155; 701/32.2
See application file for complete search history.

(56) References Cited

U.S. PATENT DOCUMENTS

| 7,554,444 B2* | 6/2009 | Rao ..................... G08B 21/0202 340/541 |
| 9,201,842 B2* | 12/2015 | Plante .................... G07C 5/008 |
| 2006/0055775 A1* | 3/2006 | Nou ....................... G08G 1/0962 348/118 |
| 2008/0014908 A1* | 1/2008 | Vasant ................... G08G 1/005 455/414.1 |
| 2008/0161995 A1* | 7/2008 | Nakajima ............ G07C 5/0891 701/32.2 |

* cited by examiner

*Primary Examiner* — Hai Phan
*Assistant Examiner* — Anthony D Afrifa-Kyei (57) ABSTRACT

A method for safeguarding a vehicle having a first image capturing device for capturing a first image, a second image capturing device for capturing a second image, and a position detector is disclosed. Based on the occurrence of alerting events along with positional information provided by the position detector, the disclosed method includes enabling the first image capturing device to capture the first image and the second image capturing device to capture the second image. The method further includes transmitting the captured first image, the captured second image, and the positional information to a pre-selected destination. The method also includes receiving a communication request asking for the first image, the second image, and the positional information and/or proactively initiating another communication request disregarding the occurrence of the alerting events.

23 Claims, 6 Drawing Sheets

400 computer media product

412
determining the occurrence of a first alerting event and using a first sensor to trigger the first image capturing device to capture the first image and transmit the first image and positional information of the vehicle to a pre-selected destination when the first alerting event occurs;
determining the occurrence of a second alerting event using a second sensor or a third alerting event using a third sensor, when the second alerting event occurs capturing the first image and transmitting the first image to the pre-selected destination, and when the third alerting event occurs capturing the second image and transmitting the second image and the positional information of the vehicle to the pre-selected destination;
determining the occurrence of a fourth alerting event using a fourth sensor and based on whether the vehicle stops traveling for more than a first predetermined period of time, and capturing the second image and transmitting the second image and the positional information to the pre-selected destination;
alternatively proactively initiating a first communication request with the pre-selected destination disregarding the occurrence of the first alerting event, the second alerting event, the third alerting event, or the fourth alerting event; and
alternatively receiving a second communication request asking for the first image, the second image, and the positional information disregarding the occurrence of the first alerting event, the second alerting event, the third alerting event, or the fourth alerting event.

402 a non-propagating signal bearing medium 404 a communication medium 406 a non-transitory computer readable medium 408 a recordable medium

Fig. 4

APPARATUS AND METHOD FOR SAFEGUARDING VEHICLES

BACKGROUND

1. Technical Field

The present disclosure relates to vehicle safeguarding, and more particularly, to an apparatus and a method of safeguarding a vehicle by responding to multiple events occurred to the vehicle on a timely basis to minimize the impact of the same.

2. Description of Related Art

Traditional vehicle safeguarding systems utilize image capturing devices to record certain events in storage units of the apparatus. And the content of the storage units could be accessed later from which people could learn what has actually transpired. The above approach, however, fails to take into account the potential urgency nature associated with the events. For example, when a vehicle is stolen or when the vehicle involves in any car accidents. When either of above happens, information such as images outside the vehicle over the course of the vehicle being stolen or images within the vehicle suggesting the possibility that a vehicle user has been unconscious after the accident may need to be accessible immediately. Therefore, despite the stolen vehicle could be located based on its positional information (e.g., GPS location), any emergency service could be dispatched if the images inside the vehicle have been taken and indicate such need.

SUMMARY

The present disclosure provides a method for safeguarding a vehicle having a first image capturing device for capturing a first image, a second image capturing device for capturing a second image, and a position detector is disclosed. Based on the occurrence of alerting events along with positional information provided by the position detector, the disclosed method includes enabling the first image capturing device to capture the first image and the second image capturing device to capture the second image. The method further includes transmitting the captured first image, the captured second image, and the positional information to a pre-selected destination. The method also includes receiving a communication request asking for the first image, the second image, and the positional information disregarding the occurrence of the alerting events.

For further understanding of the present disclosure, reference is made to the following detailed description illustrating the embodiments and examples of the present disclosure. The description is only for illustrating the present disclosure, not for limiting the scope of the claim.

BRIEF DESCRIPTION OF THE DRAWINGS

The drawings included herein provide further understanding of the present disclosure. A brief introduction of the drawings is as follows:

FIG. 4 shows a schematic diagram illustrating a computer readable media product 400, according to one embodiment of the disclosure.

DESCRIPTION OF THE EXEMPLARY EMBODIMENTS

The aforementioned and other technical contents, features, and efficacies will be shown in the following detail descriptions of a preferred embodiment corresponding with the reference figures.

Figure 1A:
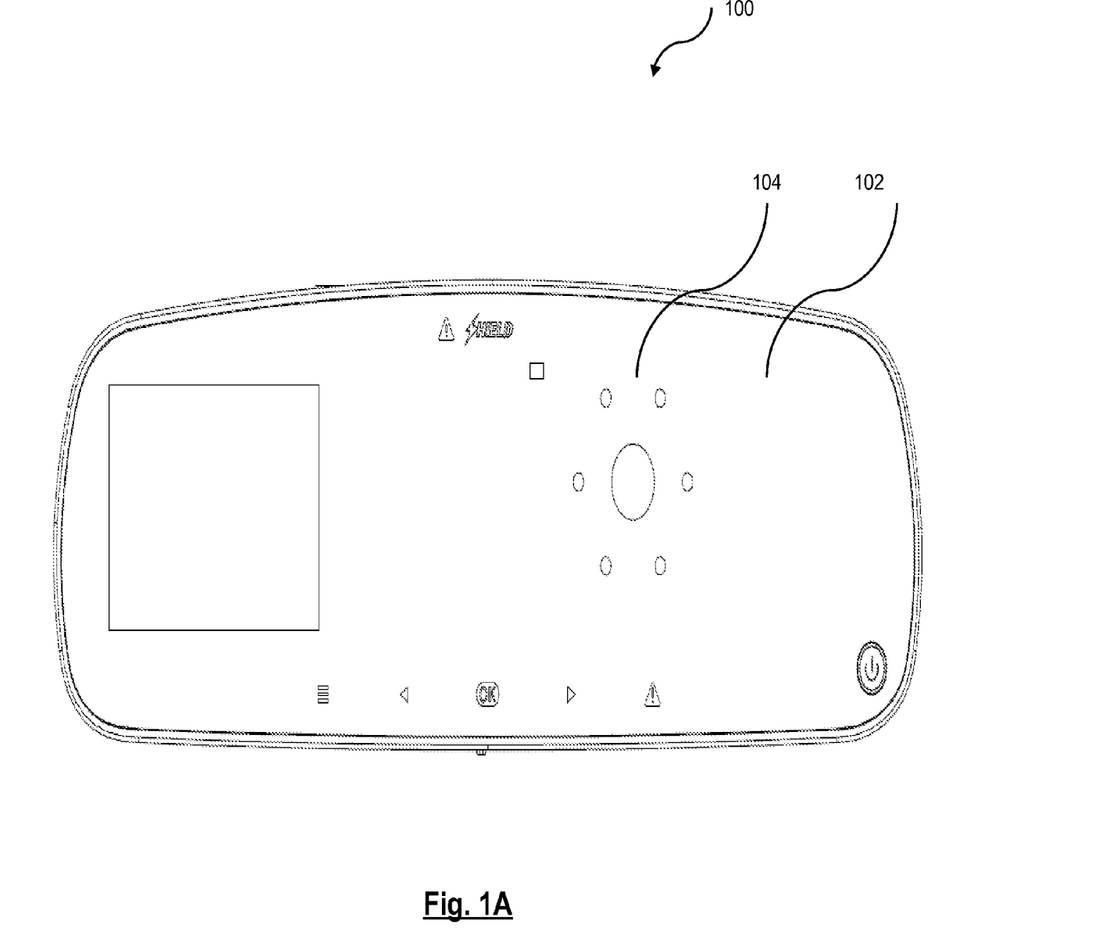
FIG. 1A shows a front view of a vehicle safeguarding apparatus according to one embodiment of the present disclosure.
Figure 1B:
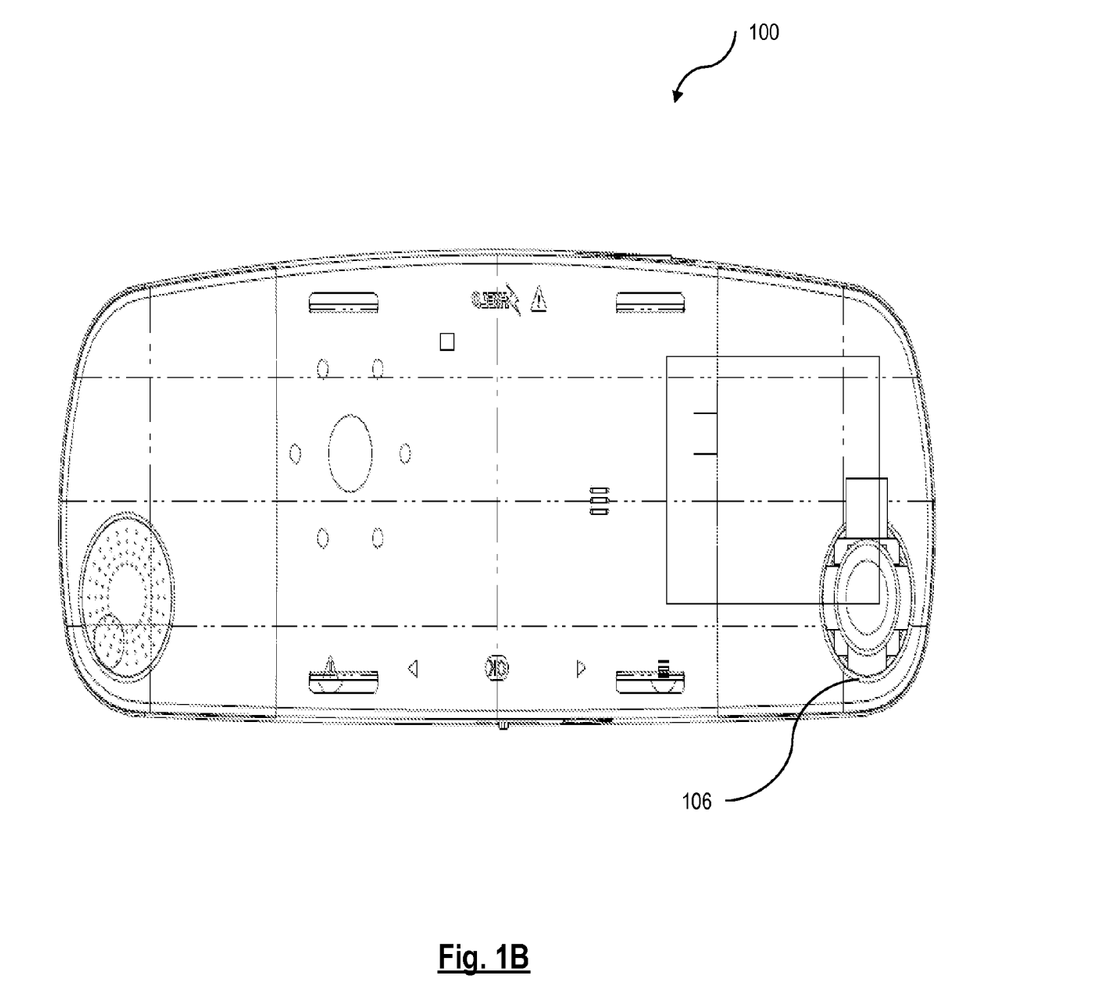
FIG. 1B shows a back view of the vehicle safeguarding apparatus in FIG. 1A according to one embodiment of the present disclosure.
Figure 1C:
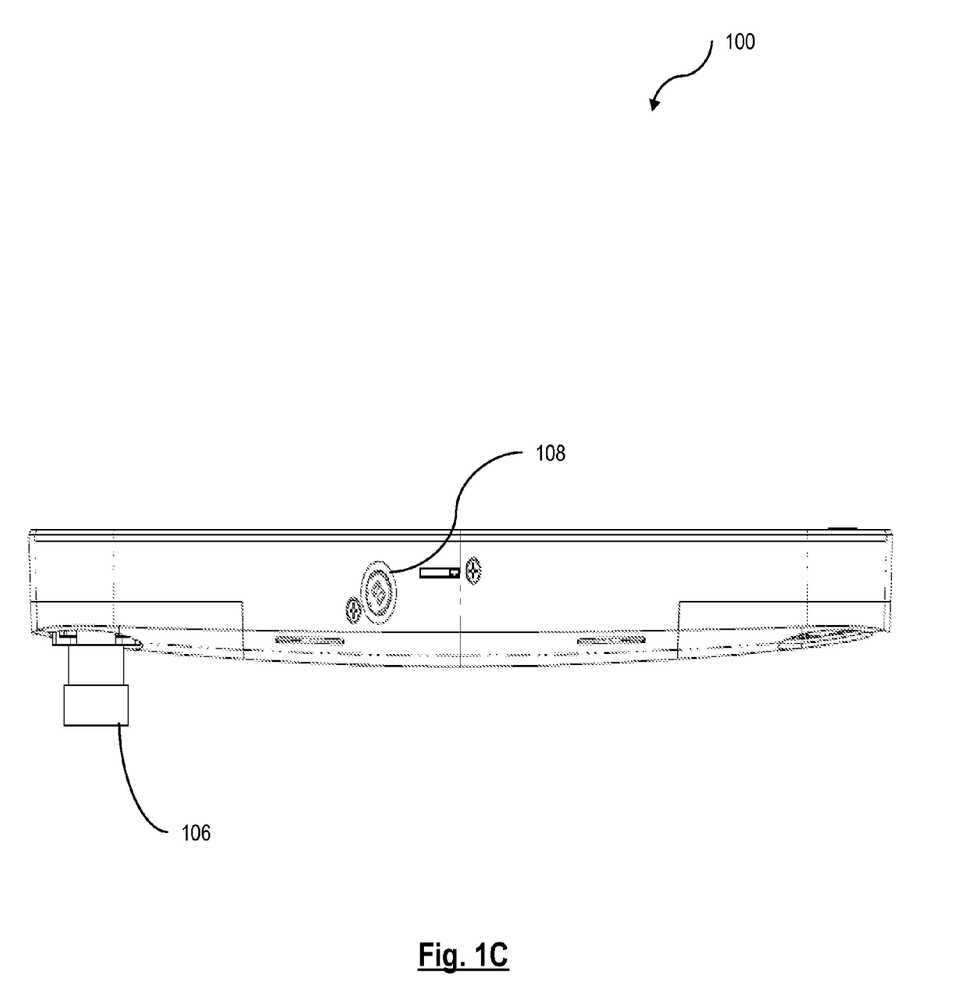
FIG. 1C shows a bottom view of the vehicle safeguarding apparatus in FIG. 1A according to one embodiment of the present disclosure.

Please refer to FIGS. 1A-1C showing schematic diagrams of an apparatus capable of safeguarding a vehicle 100 according to one embodiment of the present disclosure. Specifically, FIG. 1A is the front view of the vehicle safeguarding apparatus 100, FIG. 1B is the back view of the vehicle safeguarding apparatus 100, and FIG. 1C is the bottom view of the same vehicle safeguarding apparatus 100. In one implementation, the vehicle safeguarding apparatus 100 may be integrated with a rear mirror 102. In another implementation, the vehicle safeguarding apparatus 100 and the rear mirror may be separately disposed. In other words, the safeguarding apparatus 100 may not be equipped with the rear mirror 102.

The vehicle safeguarding apparatus 100 may include a first image capturing device 104 and a second image capturing device 106. In one implementation, the first image capturing device 104 may be a camera/cam-coder while the second image capturing device 106 may be another camera/cam-coder. Though only two image capturing devices may be discussed throughout the present disclosure, the number of the image capturing devices may be more than two to meet the additional requirement.

Further, the image throughout the present disclosure may refer to one single image or a series of images constituting a video stream. When the first image capturing device 104 and the second image capturing device 106 are cameras, they may capture single images. On the other hand, when the first image capturing device 104 and the second image capturing device 106 are cam-coders they might capture at least one series of images.

The first image capturing device 104 may be on a first surface of the vehicle safeguarding apparatus 100, while the second image capturing device 106 may be on a second surface of the vehicle safeguarding apparatus 100. In one implementation, the first image capturing device 104 and the rear mirror 102 may be on the same side/surface of the vehicle safeguarding apparatus 100. And the second image capturing device 106 may be on the opposite side of the vehicle safeguarding apparatus 100. In another implementation, the position of the second image capturing device may hinge on the side of the driver seat.

In one implementation, the first image capturing device 104 may be beneath the rear mirror 102 or invisible from anyone within the vehicle, which may reduce the possibility of the first image capturing device 104 being compromised.

The vehicle safeguarding apparatus 100 may operate with a first sensor 108, a second sensor, a third sensor, a fourth sensor, and a position detector. Despite the third sensor and the fourth sensor are mentioned in the present disclosure, the third sensor and the fourth sensor in at least one embodiment of the present disclosure may be the same sensor. Similarly, the first sensor 108 and the second sensor may be the same sensor in one embodiment of the present disclosure. In another implementation, the first sensor, the second sensor, the third sensor, and the fourth sensor may be the same sensor. Location of the first sensor 108, the second sensor, the third sensor, and the fourth sensor may be predetermined. For example, the first sensor 108, the second sensor, and the third sensor may be placed on a separate circuit board physically away from the vehicle safeguarding apparatus 100, with the fourth sensor installed with the vehicle safeguarding apparatus 100. In another implementation, all of the first sensor 108, the second sensor, the third sensor, and the fourth sensor may be installed with the vehicle safeguarding apparatus 100. In another implementation, the first sensor 108, the second sensor, the third sensor, and the fourth sensor may be physically away from the vehicle safeguarding apparatus 100.

The first image capturing device 104 when activated may be used to capture images within the vehicle, while the second image capturing device 106 when activated may be used to capture images outside the vehicle or from the perspective of a vehicle user. The position detector may be configured to determine the travelling distance of the vehicle in addition to current coordinate of the vehicle.

In one implementation, the first sensor 108 may be a motion sensor or an infrared sensor and used to detect any movement within the vehicle such as in the driver seat when the vehicle is accessed without authorization. That the vehicle is accessed without authorization and any movement within the vehicle has been detected may be categorized as a first alerting event. Upon the occurrence of the first alerting event, the vehicle safeguarding apparatus 100 may cause the first image capturing device 104 to capture an image of an unauthorized vehicle user. When the first alerting event occurs, the second image capturing device 106 may capture an image outside the vehicle. And the image of the unauthorized vehicle user and/or the image outside the vehicle may be transmitted out of the vehicle.

An authorized vehicle user may be equipped with a car key in which a communication device is disposed and identity information is stored. In one implementation, the communication device may rely on a first communication protocol (e.g., Bluetooth communication protocol). The car key may rely on the communication device to communicate the identity information with the vehicle safeguarding apparatus 100 using the first communication protocol. In another implementation, the identity information may be stored in a portable communication device of the authorized vehicle user. Such portable communication device may initiate the communication of the identity information with the vehicle safeguarding apparatus 100.

Generally, when the authorized vehicle user opens a door of the vehicle he/she may initiate the communication between the car key and the vehicle safeguarding apparatus 100, allowing for the vehicle safeguarding apparatus 100 to properly identify identity of the person holding such car key.

The identity of the authorized vehicle user may be confirmed by other approaches without the car key or the portable communication device involved. For instance, biometric authentication may be employed for the confirmation of the identity of the vehicle user. The biometric authentication includes but is not limited to fingerprint, iris recognition, and/or face recognition.

The authorized vehicle user may access the vehicle without initiating the communication of the identity information to the vehicle safeguarding apparatus 100. When the communication of the identity information between the car key and the vehicle safeguarding apparatus 100 is not initiated after the door of the vehicle is opened or the car key used to open the door is not with the proper identity information, the first alerting event may be considered taking place as well.

Similarly, when the vehicle user fails the key-less (or portable communication device-less) based identity confirmation the first alerting event may be considered taking place also.

In one implementation, the second sensor may be a vibration sensor for detecting a second alerting event such as break-in or any intentional infliction of damage on the vehicle. In another implementation, the second sensor may be an air pressure sensor capable of detecting changes to air pressure inside the vehicle. When any break-in takes place, the air pressure inside the vehicle may change, triggering the second sensor. Upon the occurrence of the second alerting event, the vehicle safeguarding apparatus 100 may cause the first image capturing device 104 to capture the image of an intruder or someone damaging the vehicle. When the second alerting event occurs, the vehicle safeguarding apparatus 100 may also cause the second image capturing device 106 to capture the images outside the vehicle. The image of the intruder or someone damaging the vehicle and/or the image outside the vehicle may be transmitted out of the vehicle.

Occurrence of a third alerting event may be determined based on whether any vibration to the vehicle is detected by the third sensor. In one implementation, the third sensor may be a gravity sensor (G-sensor).

If the third sensor detects the vibration, the vehicle safeguarding apparatus 100 may conclude the third alerting event has taken place. When the third alerting event occurs, the first image capturing device 104 and the second image capturing device 106 may be caused to capture images within the vehicle and outside the vehicle, respectively. As with occurrence of the first alerting event and the second alerting event, at the time the third alerting event takes place the images within and outside the vehicle may be transmitted out of the vehicle. The third alerting event may involve natural disasters such as flooding or car towing, which may displace the vehicle beyond the control of the vehicle user. The third alerting event may be considered taking place when the parked vehicle got accidentally hit from behind by another vehicle behind it.

The fourth sensor in one implementation may be another G-sensor. The vehicle safeguarding apparatus 100 may rely on the fourth sensor, to determine the occurrence of a fourth alerting event. The fourth alerting event in one implementation may be a car accident the vehicle involves. And the vehicle safeguarding apparatus 100 may further turn to the position detector before determining whether the vehicle, after the fourth sensor detects the vibration associated with the car accident, stops travelling for a first predetermined period of time. In one implementation, the first predetermined period of time may be 5 minutes though other time period may be utilized also.

At the time the fourth sensor detects the vibration and the vehicle starting from the detection of the vibration by the fourth sensor fails to travel for more than the first predetermined period of time, the fourth alerting event may be considered taking place.

The fourth alerting event may be considered taking place disregarding whether the vehicle stops traveling for the first predetermined period of time at which point the vehicle user may proactively trigger an alarm button. The fourth alerting event may be considered taking place as well when the fourth sensor detects the vibration without taking into account the lapse of the first predetermined period of time. In other words, the occurrence of the fourth alerting event may disregard whether the vehicle is travelling or not.

When the fourth alerting event occurs, the first image capturing device 104 and the second image capturing device 106 may be caused to capture the images within and outside the vehicle, respectively. The captured images within and outside the vehicle along with positional information may be further transmitted out of the vehicle.

Figure 2:
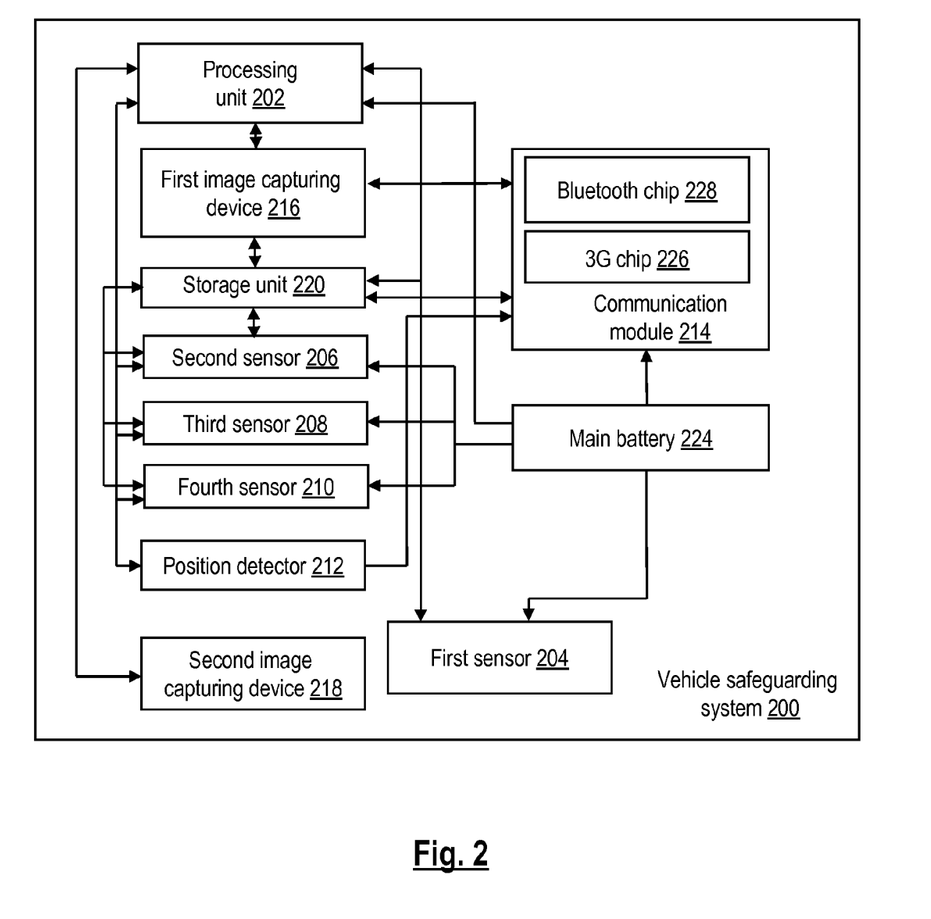
FIG. 2 shows a simplified block diagram of a vehicle safeguarding system according to one embodiment of the present disclosure.

Please refer to FIG. 2 of a simplified block diagram of a vehicle safeguarding system 200 according to one embodiment of the present disclosure. It is worth noting that the vehicle safeguarding system 200 may have components thereof separately placed. For example, the vehicle safeguarding system 200 may have one vehicle safeguarding apparatus (such as the vehicle safeguarding apparatus 100) disposed at one location and certain sensors placed at other locations. In another implementation, the vehicle safeguarding system 200 may have the vehicle safeguarding apparatus including all the necessary sensors placed therein.

Specifically, the vehicle safeguarding system 200 may include a processing unit 202, a first sensor 204, a second sensor 206, a third sensor 208, a fourth sensor 210, a position detector 212, and a communication module 214. The vehicle safeguarding system 200 may also include a first image capturing device 216, a second image capturing device 218, and a storage unit 220. In another implementation, the communication module 214 may effectively provide the processing unit 202 responsible for the operation of the vehicle safeguarding system 200.

The first sensor 204, the second sensor 206, and the third sensor 208 may be placed on the same sensor board. The sensor board having all those sensors disposed may require one additional processing unit (not shown) responsible for operations of those sensors. The additional processing unit may be a micro-controller or MCU, and may be in connection with the processing unit 202. As such, the processing unit 202 may indirectly be responsible for the operations of those sensors. Specifically, the processing unit 202, whether it is provided by the communication module 214 or not, may ensure the first sensor 204, the second sensor 206, and the third sensor 208 are powered when the engine of the vehicle is turned off. Meanwhile, processing unit 202, whether it is provided by the communication module 214 or not, may ensure the fourth sensor 210 is powered when the door of the vehicle is opened again after the engine is turned off. In other words, the first sensor 204, the second sensor 206, and the third sensor 208 may be always powered. And when any of those sensors 204-210 detect the potential occurrence of the alerting events they may inform the processing unit 202 of the same through GPIO pins thereof.

The vehicle safeguarding system 200 may include a main battery 224. The communication module 214 may further include a third generation (3G) chip 226 and a Bluetooth chip 228. It is worth noting that the 3G chip 226 and the Bluetooth chip 228 are only examples for the illustration purpose. Other communication-enabled components may be used here so long as bi-lateral communication for the vehicle safeguarding system could be facilitated. The main battery 224 may always power the processing unit 202 or the communication module 214 when the communication module 214 provides the processing unit 202. Thus, the processing unit 202 may properly activate the sensors along with the communication module 214 to ensure the vehicle could be effectively safeguarded.

Vehicle safeguarding program may be stored in the storage unit 220. In one implementation, the storage unit 220 may be a read-only memory (ROM). The images captured by the first image capturing device 216 and/or the second image capturing device 218 may be stored in another storage unit such as a SD card (not shown). The vehicle safeguarding program may be having instructions executable by the processing unit 202 for any corresponding vehicle safeguarding to be realized.

Meanwhile, the communication module 214 may be in its first operating mode when none of the alerting events takes place. In one implementation, the first operating mode is 2G communication mode. The communication module 214 may switch to its second operating mode for every ten minutes, before returning to the first operating mode. In one implementation, the second operating mode of the communication module 214 is 3G communication mode. As such, the overall power consumption of the vehicle safeguarding system 200 may be reduced.

It is worth noting that the switch to the second operating mode may be prompted by the occurrence of the alerting events disregarding whether the time for the switch to the second operating mode has lapsed.

When the first alerting event occurs, the processing unit 202 may execute instructions to cause the first image capturing device 216 to capture the image within the vehicle and the second image capturing device 218 to capture the image outside the vehicle. In another implementation, only the first image capturing device 216 may be prompted to capture the image within the vehicle when the first alerting event occurs. With the captured image (first image) such as the face of the person stealing the vehicle, the processing unit 202 may cause the communication module 214 (or the 3G chip 226) to transmit the captured first image to a pre-selected destination. In one implementation, the pre-selected destination may be a portable communication device of the authorized vehicle user. In another implementation, the pre-selected destination may include a portable communication device of the husband/wife of the authorized vehicle user as well. In addition to having the image within the vehicle or the image outside the vehicle captured, the processing unit 202 may also cause the positional information of the vehicle to be transmitted to the pre-selected destination. The transmission of the captured first image may be used to alarm the authorized vehicle user. In another implementation, the pre-selected destination may be a central server, which may also collect vehicular information. The vehicular information may include but not be limited to the mileage, speed, and the wear and tear of the tires. With the collected vehicular information, the central server may proactively prompt the vehicle user to have his/her vehicle checked such as oil changing and/or tire replacing.

The processing unit 202 may also process a vocal communication request that may be received through the communication module 214 (or the 3G chip 226), allowing for the authorized vehicle user to be in vocal contact with the person stealing the vehicle after the authorized vehicle user is alarmed. For example, the vocal communication request may be received or the corresponding vocal communication may be facilitated when the first alerting event or the second alerting event occurs. As such, the person stealing or damaging the vehicle may rethink about his/her plan of perpetrating the crime. The processing unit 202 may also transmit the positional information of the vehicle, which may be determined by the position detector 212, to the pre-selected destination through the communication module 214. The positional information may be relayed to a nearby police officer thereafter. In another implementation, the vocal communication request may be received or the corresponding vocal communication may be facilitated when the fourth alerting event occurs.

The Bluetooth chip 228 may be used to receive the identity information from the vehicle user so that the processing unit 202 may determine whether the vehicle user is the authorized one. The Bluetooth chip 228 may be replaced by ZIGBEE-based chip in another implementation. It is worth noting that the receipt of the identity information of the vehicle user and the transmission of the captured images and the positional information may be through the same communication unit. For instance, both may be through the 3G chip 226 though the 3G chip 226 may be replaced by other communication units such as one 4G/LTE chip.

When the first alerting event takes place, the positional information of the vehicle may be transmitted to the pre-selected destination as well. When the second alerting event occurs, the processing unit 202 may also execute instructions to cause the first image capturing device 216 to capture the image within the vehicle and the second image capturing device 218 to capture the image outside the vehicle. In another implementation, only the first image capturing device 216 may be prompted to capture the image within the vehicle. The Bluetooth chip 228 of the communication module 214 may be used to identify the identity of the vehicle user by receiving the identity information from the vehicle user. With the captured first image such as the face of the person committing the break-in, the processing unit may cause the 3G chip 226 of the communication module 214 to transmit the captured first image to the pre-selected destination, which may serve to alarm the authorized vehicle user. Similar to the occurrence of the first alerting event, the positional information may be transmitted to the pre-selected destination at the time when the second alerting event occurs.

When the third alerting event occurs, the processing unit 202 may execute instructions to cause the second image capturing device 218 to capture the image outside the vehicle, the first image capturing device 216 to capture the image within the vehicle, and the position detector 212 to provide positional information of the vehicle. And the processing unit 202 may further through the 3G chip 226 of the communication module 214 transmit the image outside the vehicle, the image within the vehicle, and the positional information to the pre-selected destination. As such, the authorized vehicle user may learn the whereabouts of the vehicle. The positional information may be transmitted to the pre-selected destination through the communication module 214.

When the fourth alerting event occurs, the processing unit 202, may determine whether the vehicle stops traveling for the predetermined period of time after the occurrence of the fourth alerting event by the position detector 212. If that is the case, the processing unit 202 may further cause the first image capturing device 216 to capture the first image (or the image inside the vehicle) and the second image capturing device to capture the second image (or the image outside the vehicle), before causing the 3G chip 226 of the communication module 214 to transmit the captured first image, the captured second image, and the positional information to the pre-selected destination.

The processing unit 202 may be configured to receive another communication request initiated by the authorized vehicle user through the 3G chip 226. Such request may ask for the processing unit 202 to provide the first image, the second image, and/or the positional information of the vehicle, despite no alerting events have been taking place and when the authorized vehicle user is away from his/her vehicle. When the vehicle user is within the vehicle, such communication request may be initiated by the vehicle user through the processing unit 202 as well, especially when something unexpected (e.g., armed robbery when stopping at the traffic signal) takes place disregarding the occurrence of the first alerting event, the second alerting event, the third alerting event, and/or the fourth alerting event.

In short, the communication request may be either remotely initiated to be delivered to the vehicle or transmitted from the vehicle.

Figure 3:
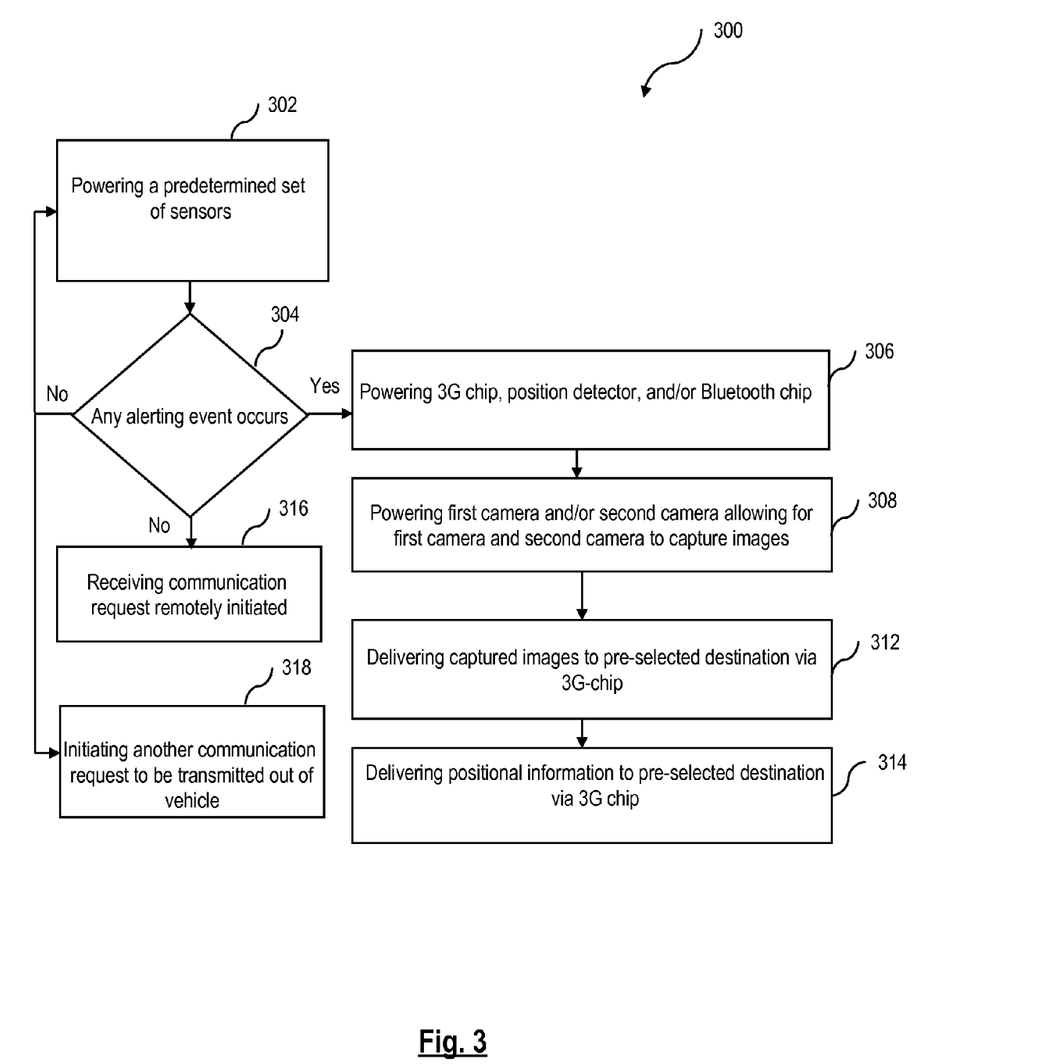
FIG. 3 shows a flow chart illustrating an operational process for a vehicle safeguarding system according to one embodiment of the present disclosure.

In conjunction with FIG. 2, please refer to FIG. 3 illustrating an operational flow chart of an operational process 300 for a vehicle safeguarding apparatus according to one embodiment of the present disclosure.

The operational process 300 may start when for example the authorized vehicle user locks the door of the vehicle. The operational process 300 may include powering a predetermined set of sensors (step 302). When the engine of the vehicle is turned off, the sensors to be powered may include the first sensor, the second sensor, and the third sensor. When the door of the vehicle is opened again allowing for the vehicle user to have the access to the vehicle (for example, the vehicle user could turn on the engine and drive the vehicle), the additional fourth sensor may be powered as well. In step 304, the operational process 300 may determine whether any alerting event takes place. If so, the operational process may proceed to step 306 where the 3G chip, the position detector, and/or Bluetooth chip may be powered. If no alerting event is considered taking place, the operational process may return to step 302 enabling the sensors to be remained powered.

In step 308, the operational process 300 may include powering the first camera and/or the second camera and causing the first camera and/or the second camera to capture the first image and/or the second image. In step 312, the operational process 300 may further deliver the captured first image and/or the captured second image to the pre-selected destination through the 3G chip. Plus, the operational process 300 may further deliver the positional information to the pre-selected destination via the 3G chip.

The operational process 300 may also include step 316 for receiving a remotely initiated communication request when no alerting event has taken place. Similarly, when no alerting event occurs, the operational process 300 may further include step 318 for proactively initiating another communication request to be transmitted out of the vehicle. It is worth noting that when step 316 is performed steps 306-314 may be prompted to be performed also. Accordingly, the remotely initiated communication request once accepted may cause the transmission of the first image, the second image, and/or the positional information to the pre-selected destination. When step 318 is to be performed, steps 306-314 may be performed, allowing for the first image, the second image, and/or the positional information to be transmitted to the pre-selected destination. Though steps 316 and 318 here may follow the non-occurrence of the alerting events (step 304), the performance of steps 316 and 318 could be in the midst of the occurrence of one alerting event or conclusion of the same.

FIG. 4 is a schematic diagram illustrating a computer readable media product 400, according to one embodiment of the disclosure. The computer readable media product 400 may comprise all computer-readable media, with the sole exception being a transitory, propagating signal. For example, the computer readable media product 400 may include a non-propagating signal bearing medium 402, a communication medium 404, a non-transitory computer readable medium 406, and a recordable medium 408. The computer readable media product 400 may also include computer instructions 412 when executed by the processing unit causing the processing unit to perform the method for safeguarding the vehicle when predetermined alerting events take place.

Some modifications of these examples, as well as other possibility will, on reading or having read this description, or having comprehended these examples, will occur to those skilled in the art. Such modifications and variations are comprehended within this disclosure as described here and claimed below. The description above illustrates only a relative few specific embodiments and examples of the present disclosure. The present disclosure, indeed, does include various modifications and variations made to the structures and operations described herein, which still fall within the scope of the present disclosure as defined in the following claims.

What is claimed is:

1. A method for safeguarding a vehicle having a first image capturing device for capturing a first image and a second image capturing device for capturing a second image, comprising:
   determining the occurrence of a first alerting event and using a first sensor to trigger the first image capturing device to capture the first image and transmit the first image and positional information of the vehicle to a pre-selected destination when the first alerting event occurs;
   determining the occurrence of a second alerting event using a second sensor or a third alerting event using a third sensor, when the second alerting event occurs capturing the first image and transmitting the first image to the pre-selected destination, and when the third alerting event occurs capturing the second image and transmitting the second image and the positional information of the vehicle to the pre-selected destination;
   determining the occurrence of a fourth alerting event using a fourth sensor and based on whether the vehicle stops travelling for more than a first predetermined period of time, and capturing the second image and transmitting the second image and the positional information to the pre-selected destination;
   alternatively proactively initiating a first communication request with the pre-selected destination disregarding the occurrence of the first alerting event, the second alerting event, the third alerting event, or the fourth alerting event; and
   alternatively receiving a second communication request asking for the first image, the second image, and the positional information disregarding the occurrence of the first alerting event, the second alerting event, the third alerting event, or the fourth alerting event.

2. The method according to claim 1, further comprising facilitating a vocal communication between the vehicle and the pre-selected destination when the first alerting event or the second alerting event occurs, or when the fourth alerting event occurs and the vehicle stops travelling for more than the first predetermined period of time.

3. The method according to claim 1, wherein the first image capturing device is capable of capturing the first image from a first perspective while the second image capturing device is capable of capturing the second image from a second perspective, and capturing the first image from the first perspective enables the capture of the face of a vehicle user, while capturing the second image from the second perspective enables the capture of a scene from the perspective of the vehicle user.

4. The method according to claim 1, wherein determining the occurrence of the first alerting event by identifying an identity of a vehicle user.

5. The method according to claim 1, wherein the first sensor is an infrared motion sensor for detecting the motion inside the vehicle, and the second sensor is a vibration sensor or an air pressure sensor when triggered by the second alerting event causing the first image capturing device to capture the first image.

6. The method according to claim 1, wherein the third sensor is a first gravity sensor when triggered by the third alerting event causing the second image capturing device to capture the second image.

7. The method according to claim 1, wherein the fourth sensor is a second gravity sensor when triggered by the fourth alerting event causing the first image capturing device to capture the first image and the second image capturing device to capture the second image.

8. The method according to claim 1, further comprising powering the first sensor, the second sensor, and the third sensor when an engine of the vehicle is turned off, and powering the fourth sensor when a door of the vehicle is opened.

9. An apparatus for safeguarding a vehicle, comprising:
   a first image capturing device;
   a second image capturing device, wherein when a first alerting event occurs the first image capturing device is triggered by a first sensor to capture a first image, upon the occurrence of a second alerting event, which is detected by a second sensor, the first image capturing device captures the first image, when a third alerting event occurs, which is detected by a third sensor, the second image capturing device captures a second image and upon the occurrence of a fourth alerting event, which is detected by a fourth sensor, the second image capturing device captures the second image; and
   a processing unit for when determining the occurrence of the third alerting event causing positional information of the vehicle, detected by a position detector, along with the second image to be transmitted to a pre-selected destination;
   wherein the processing unit is configured to determine the occurrence of the fourth alerting event and when the vehicle stops travelling for more than a first predetermined period of time, before causing the positional information of the vehicle and the second image to be transmitted to the pre-selected destination, and the processing unit is configured to proactively initiate a first communication request with a pre-selected destination disregarding the occurrence of the first alerting event, the second alerting event, the third alerting event, and/or the fourth alerting event before causing the first image, the second image, and/or the positional information of the vehicle to be transmitted to the pre-selected destination.

10. The apparatus according to claim 9, wherein the first image capturing device captures the first image, the second image capturing device captures the second image, and the position detector generates the positional information upon the receipt of a second communication request remotely initiated disregarding the occurrence of the first alerting event, the second alerting event, the third alerting event, and/or the fourth alerting event.

11. The apparatus according to claim 9, further comprising a communication module for receiving the communication request and transmitting the first image, the second image, and the positional information to the pre-selected destination.

12. The apparatus according to claim 9, wherein the first image capturing device captures the first image from a first perspective while the second image capturing device captures the second image from a second perspective, and the first image capturing device capturing the first image from the first perspective enables the capture of the face of a vehicle user, while the second image capturing device capturing the second image from the second perspective enables the capture of a scene from the perspective of the vehicle user.

13. The apparatus according to claim 9, wherein the processing unit is further configured to facilitate a vocal communication between the vehicle and the pre-selected destination when the first alerting event or the second alerting event occurs or when the fourth alerting event occurs.

14. The apparatus according to claim 9, wherein the processing unit is further configured to power the first sensor, the second sensor, and the third sensor when an engine of the vehicle is turned off, and to power the fourth sensor when a door of the vehicle is opened.

15. The apparatus according to claim 9, wherein the processing unit is further configured to identify an identity of a vehicle user.

16. A non-transitory computer readable medium comprising a set of computer instructions when executed by a processing unit for safeguarding a vehicle causing the processing unit to:
(a) determine the occurrence of a first alerting event and use a first sensor to trigger the first image capturing device to capture the first image when the first alerting event occurs and cause the first image and positional information of the vehicle to be transmitted to a pre-selected destination;
(b) determine the occurrence of a second alerting event using a second sensor or a third alerting event using a third sensor, when the second alerting event occurs capture the first image and transmit the first image to the pre-selected destination, and when the third alerting event occurs capture the second image and transmit the second image and the positional information of the vehicle to the pre-selected destination;
(c) determine the occurrence of a fourth alerting event using a fourth sensor and based on whether the vehicle stops travelling for more than a first predetermined period of time, and capture the second image and transmit the second image and the positional information to the pre-selected destination when the fourth alerting event occurs;
(d) alternatively proactively initiate a first communication request with the pre-selected destination disregarding the occurrence of the first alerting event, the second alerting event, the third alerting event, and/or the fourth alerting event, before causing the first image, the second image, and/or the positional information of the vehicle to be transmitted to the pre-selected destination; and
(e) alternatively receive a communication request asking for the first image, the second image, and the positional information disregarding the occurrence of the first alerting event, the second alerting event, the third alerting event, or the fourth alerting event, before causing the first image, the second image, and/or the positional information of the vehicle to be transmitted to the pre-selected destination.

17. The non-transitory computer readable medium according to claim 16, further comprising the computer instructions when executed by the processing unit causing the processing unit to facilitate a vocal communication between the vehicle and the pre-selected destination when the first alerting event or the second alerting event occurs, or the fourth alerting event occurs and the vehicle has stopped travelling for more than the first predetermined period of time.

18. The non-transitory computer readable medium according to claim 16, further comprising the computer instructions when executed by the processing unit causing the processing unit to cause the first image capturing device to capture the first image from a first perspective and the second image capturing device to capture the second image from a second perspective and causing the first image capturing device to capture the first image from the first perspective enables the capture of the face of a vehicle user, while causing the second image capturing device to capture the second image from the second perspective comprises enables the capture of a scene from the perspective of the vehicle user.

19. The non-transitory computer readable medium according to claim 16, further comprising the computer instructions when executed by the processing unit causing the processing unit to identify an identity of a vehicle user.

20. The non-transitory computer readable medium according to claim 16, further comprising the computer instructions when executed by the processing unit causing the processing unit to power the first sensor, the second sensor, and the third sensor when an engine of the vehicle is turned off, and to power the fourth sensor when the door of the vehicle is opened.

21. A method for safeguarding a vehicle having a first image capturing device for capturing a first image and a second image capturing device for capturing a second image, comprising:
determining the occurrence of a first alerting event and using a first sensor to trigger the first image capturing device to capture the first image and transmit the first image and positional information of the vehicle to a pre-selected destination when the first alerting event occurs; and
determining the occurrence of a second alerting event using a second sensor, and when the second alerting event occurs capturing the first image and transmitting the first image to the pre-selected destination.

22. The method according to claim 21, further comprising determining the occurrence of a third alerting event and a fourth alerting event using a third sensor, and when the third alerting event or the fourth alerting event occurs capturing the second image and transmitting the second image to the pre-selected destination.

23. The method according to claim 22, further comprising determining the occurrence of a fourth alerting event disregarding whether the vehicle stops travelling for a first predetermined period of time after the third sensor detects the vibration.

* * * * *